US010187269B2

(12) United States Patent
Muthu et al.

(10) Patent No.: US 10,187,269 B2
(45) Date of Patent: Jan. 22, 2019

(54) MINIMIZED DISPLAY OF MONITORED EVENTS WITH LIVE SEVERITY LEVEL AND COUNT INDICATIONS

(71) Applicant: Brocade Communications Systems, Inc., San Jose, CA (US)

(72) Inventors: Suresh Muthu, San Jose, CA (US); Sathiapriya Sathiyagiri, Sunnyvale, CA (US); Prakash Kaligotla, Milpitas, CA (US); Murthy N. Bhetanabhotla, Sunnyvale, CA (US); Ning Zhou, San Jose, CA (US); David B. Hamilton, Milpitas, CA (US)

(73) Assignee: Brocade Communications Systems LLC, San Jose, CA (US)

( * ) Notice: Subject to any disclaimer, the term of this patent is extended or adjusted under 35 U.S.C. 154(b) by 1095 days.

(21) Appl. No.: 13/789,488

(22) Filed: Mar. 7, 2013

(65) Prior Publication Data

US 2014/0258873 A1 Sep. 11, 2014

(51) Int. Cl.
*G06F 3/048* (2013.01)
*H04L 12/24* (2006.01)
*H04L 12/26* (2006.01)

(52) U.S. Cl.
CPC .......... *H04L 41/22* (2013.01); *H04L 43/0817* (2013.01)

(58) Field of Classification Search
None
See application file for complete search history.

(56) References Cited

U.S. PATENT DOCUMENTS

| 7,421,472 | B1* | 9/2008 | Ross, Jr. ...................... 709/206 |
| 2001/0051890 | A1* | 12/2001 | Burgess ............................ 705/9 |
| 2004/0042470 | A1* | 3/2004 | Cooper ............... H04L 12/2602 370/401 |
| 2009/0271349 | A1* | 10/2009 | Allen et al. ..................... 706/47 |
| 2011/0238817 | A1* | 9/2011 | Okita .................. H04L 43/0817 709/224 |
| 2011/0302556 | A1* | 12/2011 | Drukman et al. ............ 717/113 |
| 2012/0166628 | A1* | 6/2012 | Kullos ............... H04L 41/5016 709/224 |
| 2012/0233181 | A1* | 9/2012 | Shehata et al. ............... 707/748 |
| 2013/0007524 | A1* | 1/2013 | Vankov ........................... 714/32 |
| 2013/0061169 | A1* | 3/2013 | Pearcy .................. G06F 21/552 715/788 |
| 2013/0157711 | A1* | 6/2013 | Lee et al. ..................... 455/525 |
| 2013/0316699 | A1* | 11/2013 | Jheng et al. .................. 455/423 |
| 2014/0297495 | A1* | 10/2014 | Dalal et al. .................... 705/37 |

* cited by examiner

*Primary Examiner* — Kevin L Young
*Assistant Examiner* — Haimei Jiang
(74) *Attorney, Agent, or Firm* — Blank Rome, LLP

(57) ABSTRACT

What is disclosed is network management software which displays a widget for tracking a particular characteristic of a network. The widget title bar contains a first and second indicator. The first indicator represents the severity of the most severe alert for the particular characteristic being tracked by the widget. The second indicator is a numerical value of the characteristic that caused the alert.

12 Claims, 9 Drawing Sheets

MINIMIZED DISPLAY OF MONITORED
EVENTS WITH LIVE SEVERITY LEVEL
AND COUNT INDICATIONS

BACKGROUND OF THE INVENTION

1. Field of the Invention

The invention relates to network device management and more particularly to displaying network indicators in a window title bar.

2. Description of the Related Art

Network management software provides network administrators a way of tracking the various characteristics of network devices, such as switches, routers, and the like, in a data communication network. Examples of these characteristics are the CPU utilization, memory utilization, unused ports, and number of events on devices in a network. Network management software, such as Brocade Network Advisor by Brocade Communication Systems, Inc., generally has a graphic user interface (GUI) that allows a network administrator to monitor numerous types of network characteristics in a single display. Each characteristic may be monitored in its own individual window called a widget. However, because there are so many types of network characteristics to monitor it is often necessary for the network administrator to minimize some of the widgets. When minimized, none of the network information being tracked by a particular widget may be seen in the GUI by an administrator. Instead, only the widget's title bar is displayed, which simply tells a network administrator which type of characteristic is being tracked by the widget. If, for example, the minimized widget monitors the memory utilization of devices in the network, and a monitored network device suddenly reaches its maximum memory utilization, a network administrator has no way of knowing that situations exists. Therefore, a method and system is needed to alert a network administrator.

SUMMARY OF THE INVENTION

Network management software displays a widget for tracking a particular characteristic of a network. The widget title bar contains a first and second indicator. The first indicator represents the severity of the most severe alert for the particular characteristic being tracked by the widget, such as by a color code. The second indicator is a numerical value for the characteristic that caused the alert.

This technique can be used on any telecommunication network.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1:
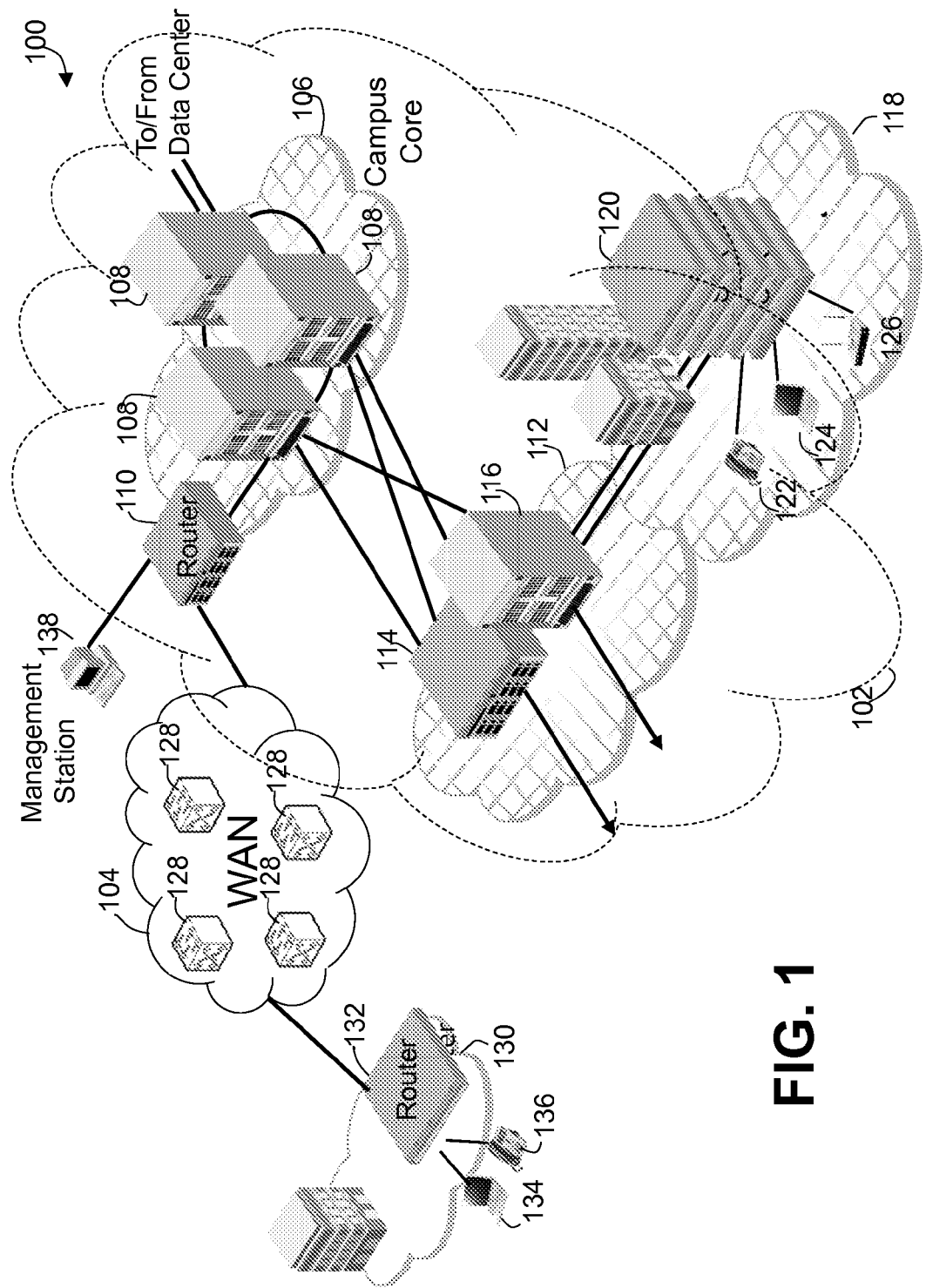
FIG. 1 is a diagram illustrating a local area network (LAN) and wide area network (WAN) as may be incorporated together with the present invention.

Referring to FIG. 1, an Ethernet network 100 is shown wherein a LAN 102 is interconnected to a remote campus 130 via WAN 104. The campus core 106 includes a plurality of interconnected core switches 108. The core switches 108 are connected to a data center (not shown). A router no is connected to the core switches and the WAN 104. The core switches 108 are connected to switches 114 and 116 of an aggregation campus 112. The aggregation campus switches 114 and 116 are connected to switches 120 of large network 118 and provide data communication services to the large network's telephone 122, computer 124, and wireless access 126 devices. The aggregation network switches 114 and 116 may also be connected to additional campuses (not shown) in order to provide additional data communication services. The LAN 102 is connected to the WAN 104 via router 110. The WAN 104 is comprised of a plurality of interconnected Ethernet switches 128 and other networking devices (not shown). WAN 104 is connected to remote campus 130 via a router 132. Router 132 provides data communication services to computers 134 and telephone devices 136. It is understood that this is an exemplary network and numerous other network topologies can be monitored according to the present invention.

In an embodiment of the present invention a management station 138 is connected to router no of the campus core 106. As will be appreciated by one having ordinary skill in the art, the management station 138 allows a network administrator to monitor the data traffic, port utilization, and various other networking characteristics of each switching device in the Ethernet network 100.

Figure 2:
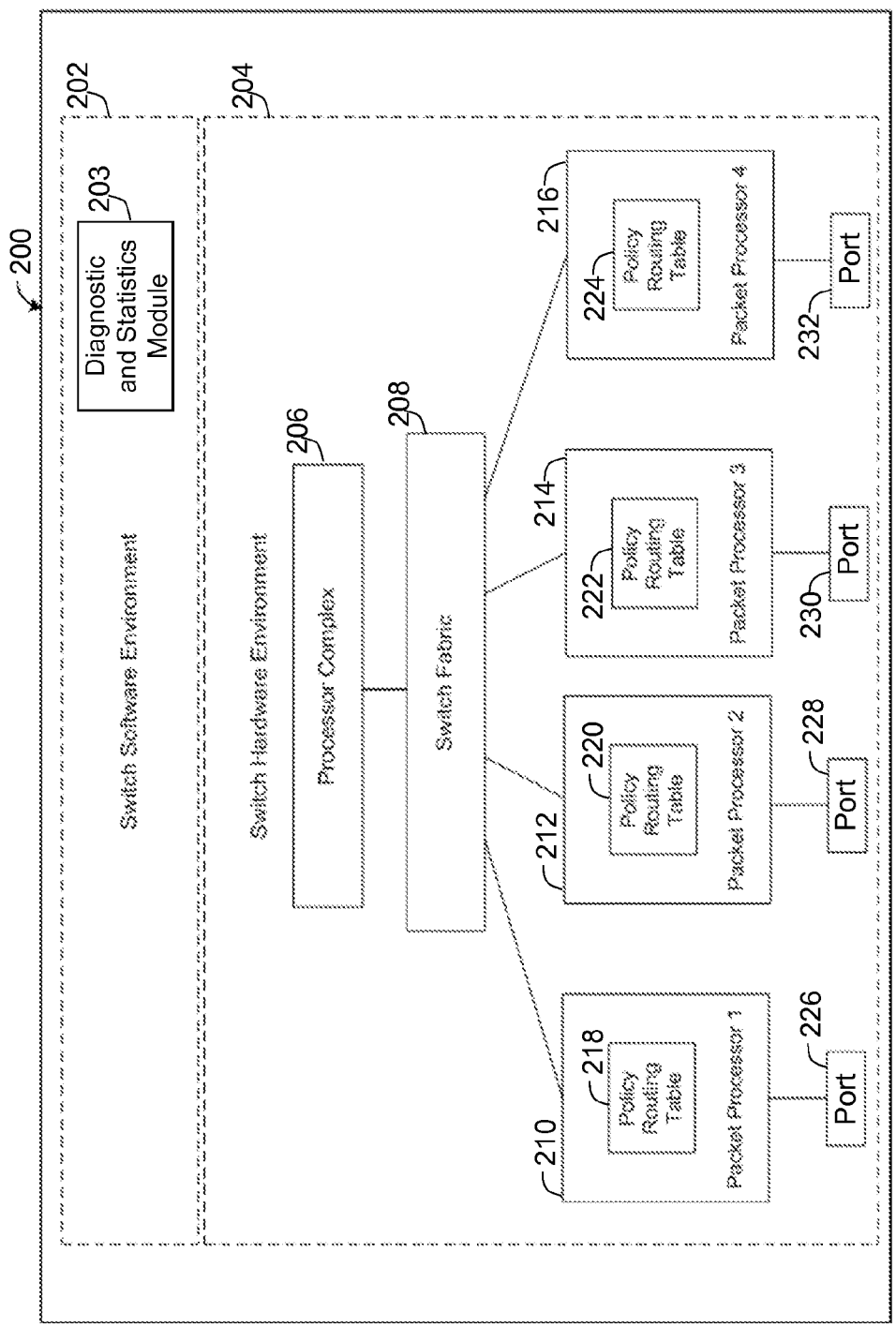
FIG. 2 is a diagram of an Ethernet Switch that may be incorporated together with the present invention.

Turning next to FIG. 2, a block diagram of an Ethernet switch or router 200 that may be utilized in Ethernet network 100 is shown. The Ethernet switch 200 comprises a switch software environment 202 and switch hardware environment 204. The software environment 202 includes a diagnostics and statistics module 203 to allow management software access to the various statistical counters in the switch 200, such as receive and transmit rate counters for each port 226, 228, 230, 232. The switch hardware environment 204 has a processor complex 206 that consists of processors as defined. The processor complex 206 is connected to a switch fabric 208, which provides the basic switching operations for the switch 200. The switch fabric 208 is connected to a plurality of packet processors 210, 212, 214, 216. Each packet processor 210, 212, 214, 216 has its own respective policy routing table 218, 220, 22, 224 to provide conventional packet analysis and routing. Each packet processor 210, 212, 214, 216 is connected to its own respective port or ports 226, 228, 230, 232. When the Ethernet switch 200 is implemented in a network such as network 100, the data value of each port 226, 228, 230, and 230 may be monitored and analyzed using management software on a management station, such as management station 136. Again, it is understood that this is an exemplary Ethernet switch architecture and numerous other architectures can be used according to the present invention.

Figure 3:
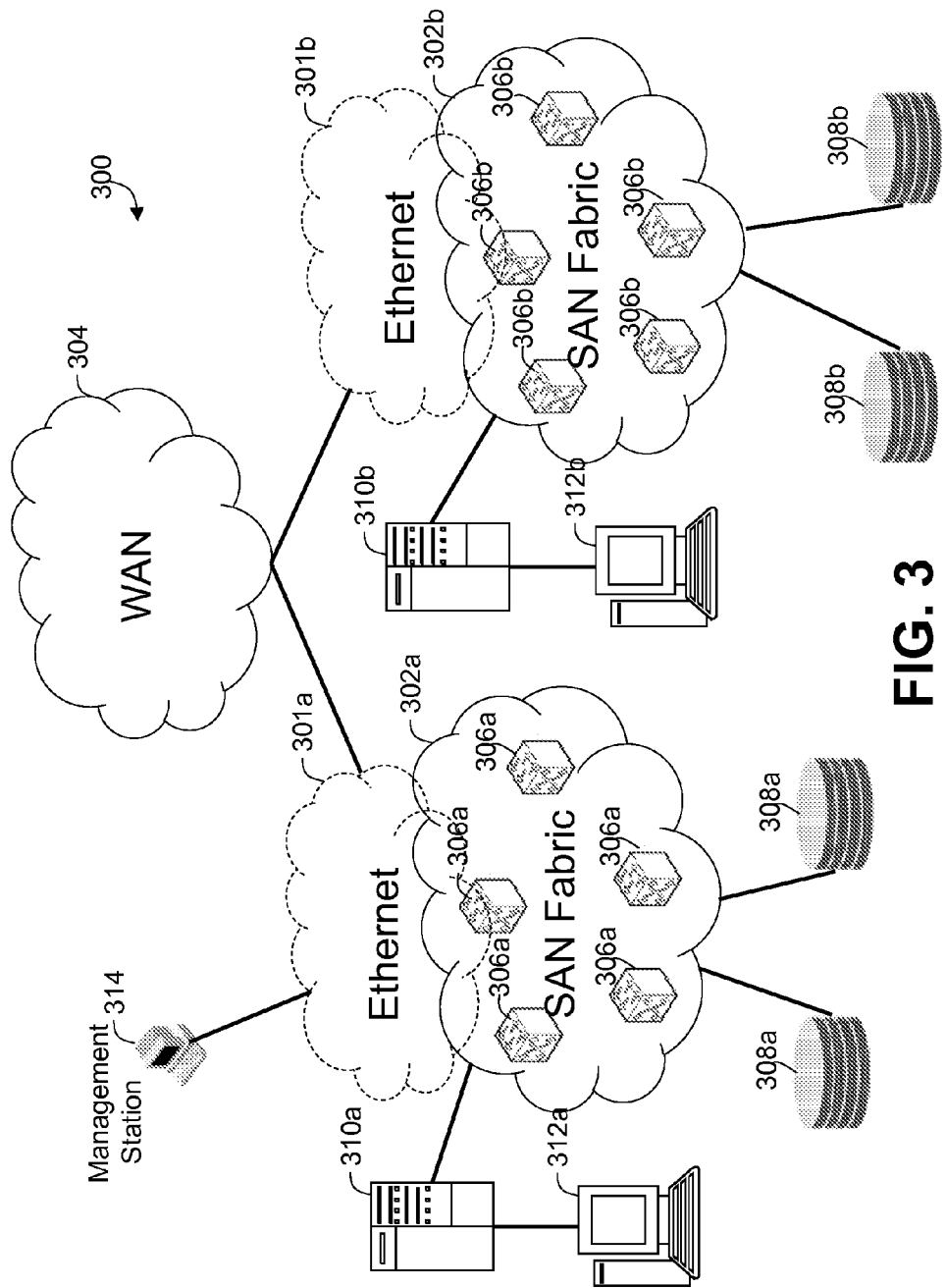
FIG. 3 is a diagram illustrating Fibre Channel (FC) storage area network (SAN) fabrics interconnected via a wide area network (WAN) as may be incorporated together with the present invention.

FIG. 3 illustrates a SAN network 300 utilizing the Fibre Channel (FC) protocol. As shown, a plurality of FC SAN fabrics 302a and 302b are interconnected via WAN 304. The SAN fabrics 302a and 302b are comprised of a plurality of FC switches 306a and 306b, respectively. SAN fabric 302a is connected to a plurality of storage devices 308a. Likewise, SAN fabric 302b is connected to a plurality of storage devices 308b. Each SAN fabric 302a and 302b connect their respective storage devices 308a and 308b to application servers 310a and 310b, which are in turn connected to computers 312a and 312b. This configuration allows for computer 312a to access storage devices 308b and for computer 312b to access storage devices 308a. As above, this is an exemplary FC SAN architecture and numerous other FC architectures can be managed according to the present invention.

In an embodiment of the present invention a management station 314 is connected to Ethernet LAN 301a, which is connected directly to SAN network 302a and indirectly to Ethernet LAN 301b via WAN 304. Ethernet LANs 301a and 301b are connected to the Ethernet management ports of the switches 306a and 306b to provide a management network for the switches 306a and 306b. As will be appreciated by one having ordinary skill in the art, the management station 314 allows a network administrator to monitor the data traffic, port utilization, and various other networking characteristics using network management software, such that any data congestion may be alleviated.

Figure 4:
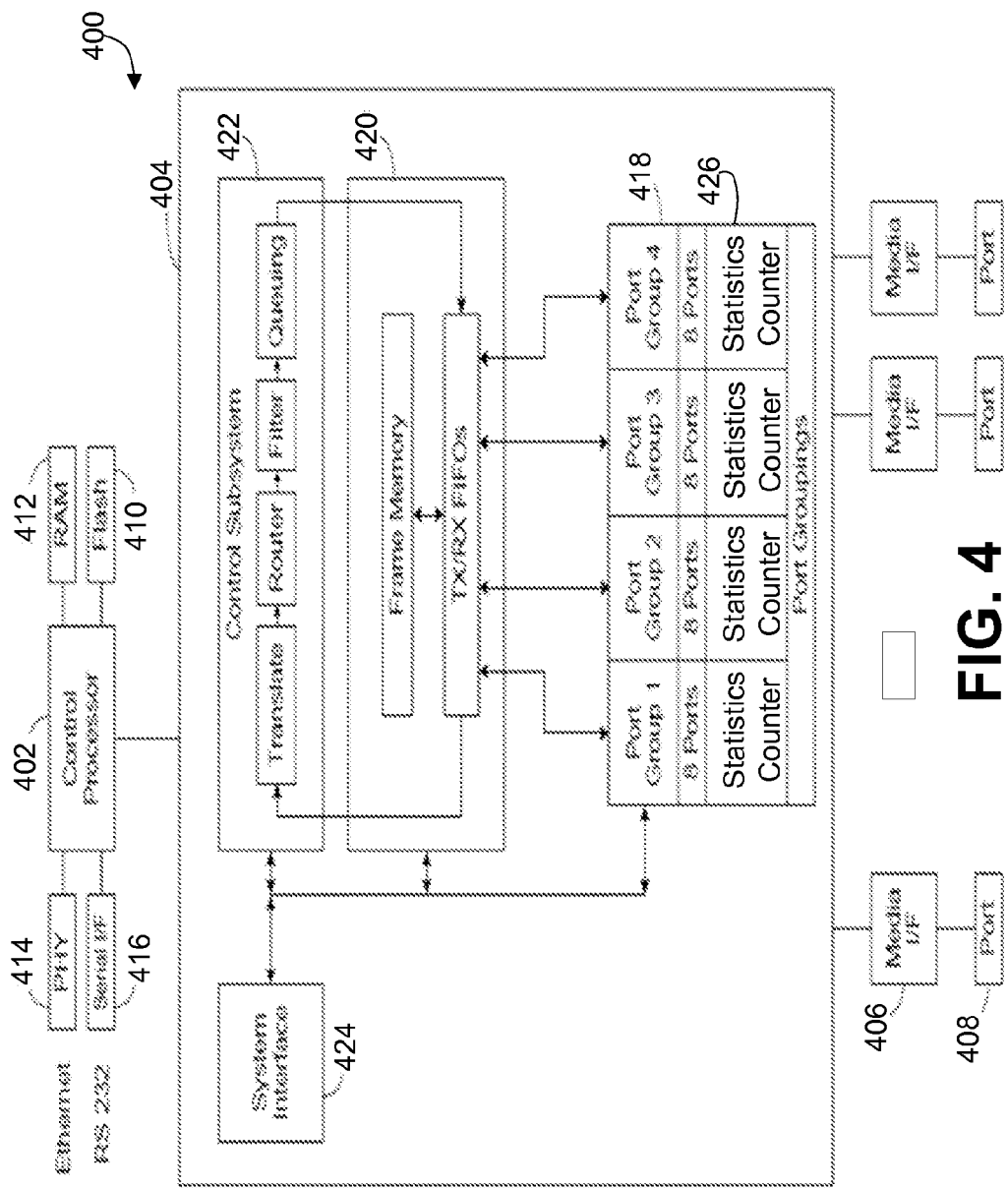
FIG. 4 is a diagram of a Fibre Channel Switch that may be incorporated together with the present invention.

FIG. 4 illustrates a block diagram of a FC switch 400 that may be utilized in accordance with the SAN network 300. A control processor 402 is connected to a switch ASIC 404. The switch ASIC 404 is connected to media interfaces 406 which are connected to ports 408. Generally the control processor 402 configures the switch ASIC 404 and handles higher level switch operations, such as the name server, the redirection requests, and the like. The switch ASIC 404 handles the general high speed inline or in-band operations, such as switching, routing and frame translation. The control processor 402 is connected to flash memory 410 to hold the software, to RAM 412 for working memory and to an Ethernet PHY 414 used for management connection and serial interface 416 for out-of-band management.

The switch ASIC 402 has four basic modules, port groups 418, a frame data storage system 420, a control subsystem 422 and a system interface 424. The port groups 418 perform the lowest level of packet transmission and reception, and include a statistical counter module 426 to allow management software to access the various statistical counters of the switch 400, such as receive and transmit rate counters for each port. Generally, frames are received from a media interface 406 and provided to the frame data storage system 420. Further, frames are received from the frame data storage system 420 and provided to the media interface 406 for transmission out a port 408.

Figure 5:
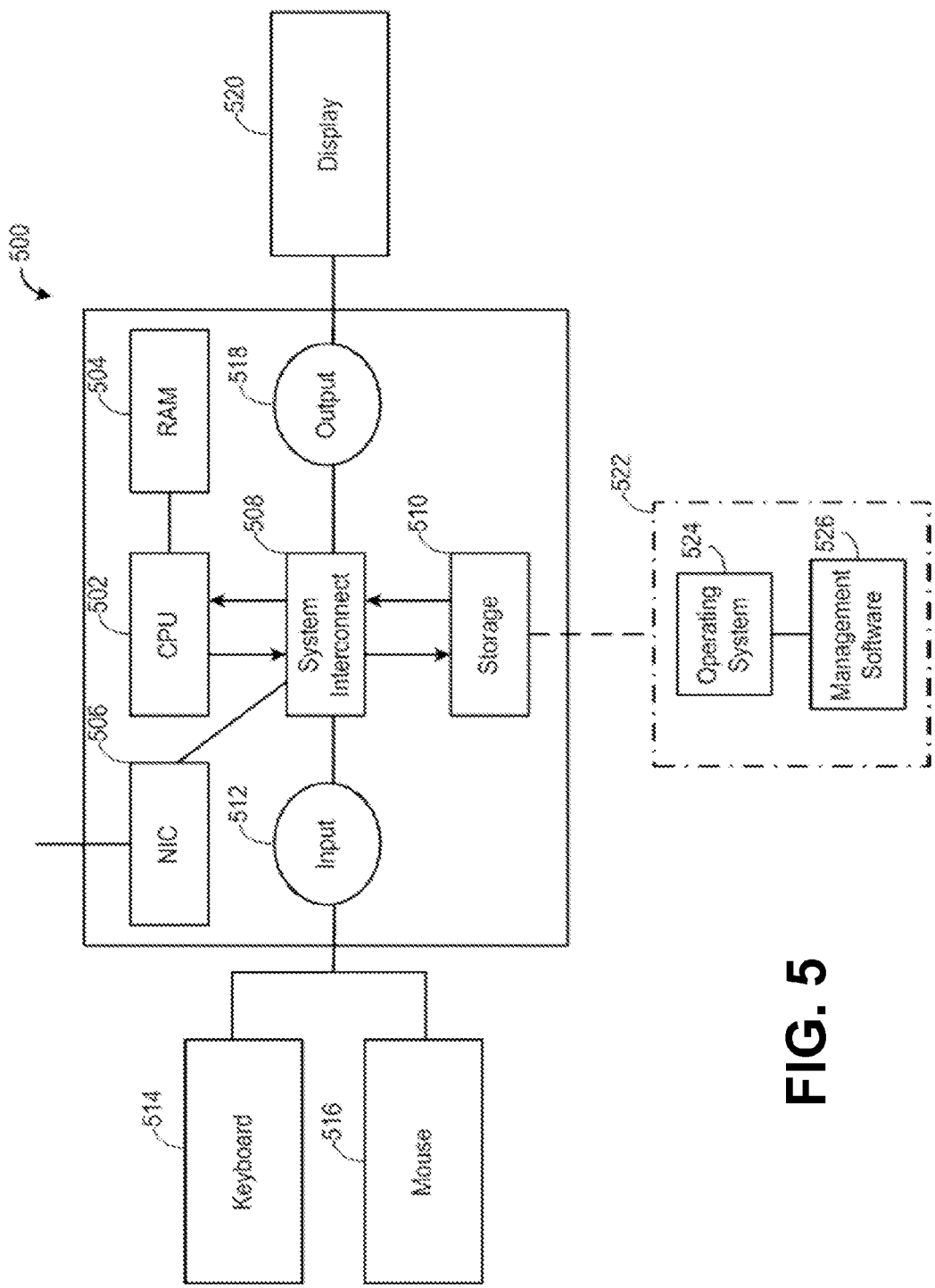
FIG. 5 is a block diagram of a management station connected to a communications network for operating in accordance with the present invention.

FIG. 5 illustrates a block diagram of a management station 500, similar to management stations 138 and 314, that may be utilized in accordance with the present invention. As shown, the management station 500 is comprised of a central processing unit (CPU) 502, random access memory (RAM) 504, network interface card (NIC) 506, system interconnect 508, storage component 510, input component 512, and output component 518 which are all interconnected via the system interconnect 508. The input component 512 may be connected to an input device such as a keyboard 514 and mouse 516. The output component 518 is connected to a display device 520, such as an LCD monitor. Storage component 510 stores software 522, which typically includes an operating system 524 and network management software 526. The NIC 506 allows the management station 500 to communicate with a network. As understood by those skilled in the art, network management software is typically designed to allow a network administrator to quickly and efficiently monitor and manage a large network via a user interface, often a graphical user interface (GUI). The network management software 526 could be, for example, Brocade Network Advisor by Brocade Communication Systems, Inc. Once booted, the management station 500 loads the operating system 524 from the storage 510 into the RAM 504. From the operating system 524 a user may run the network management software 526, which is then also loaded into the RAM 504. The interface of the network management software 526 is then displayed on the display 520 via the output component 518. The network management software 526 allows a user to monitor numerous network characteristics, such as the number events on the network, number of unused ports of network devices, memory utilization of network devices, bandwidth utilization of network devices, and CPU utilization of network devices. It is understood that this is an exemplary computer system architecture and numerous other computer architectures can be used according to the present invention.

Figure 6:
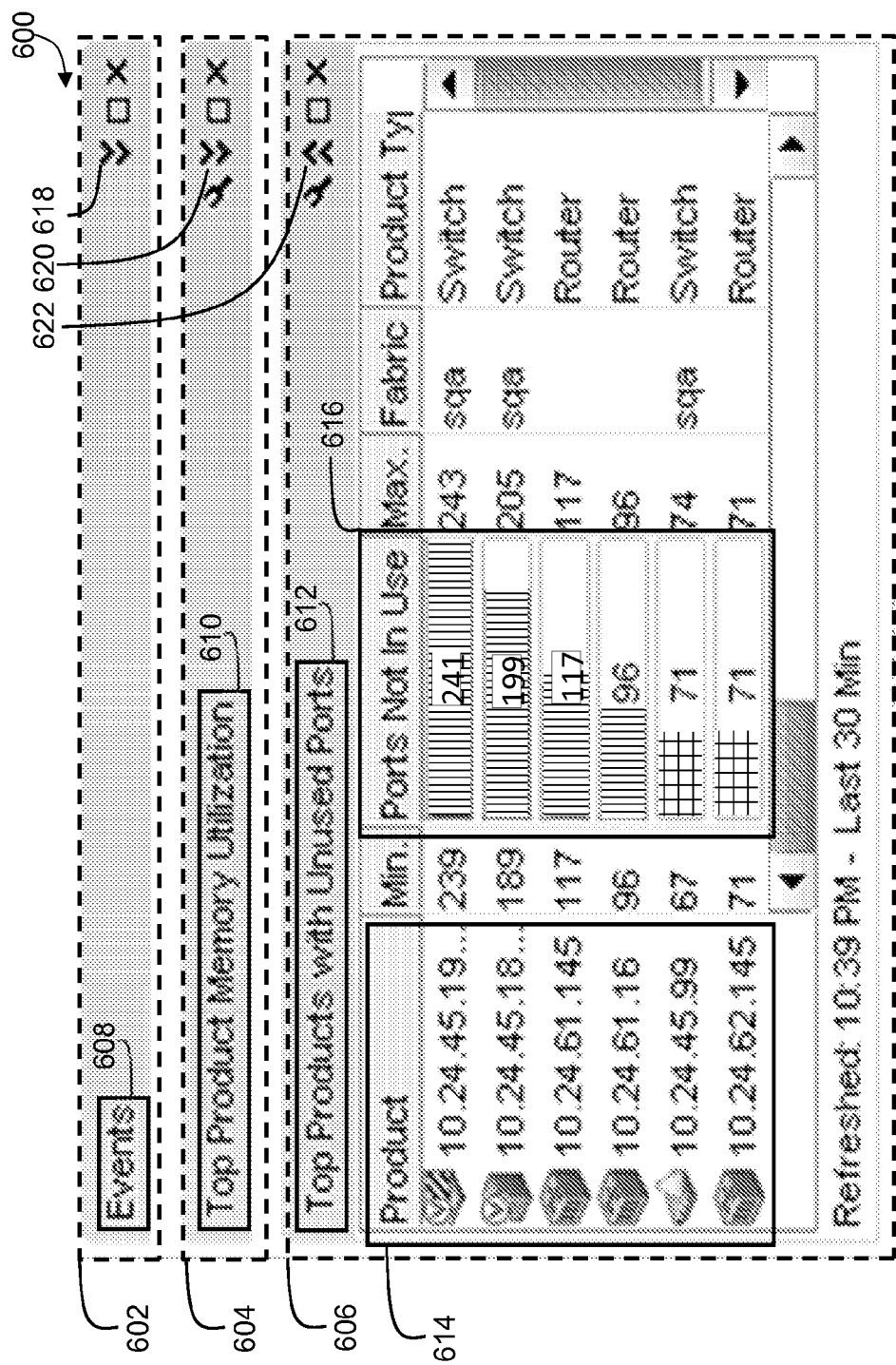
FIG. 6 is a screenshot of an example graphical user interface (GUI) illustrating aspects according to the prior art.

FIG. 6 illustrates an example of the graphic user interface (GUI) 600 of network management software 526 in partial accordance with the prior art. As shown, widgets 602, 604, 606 all track particular characteristics 608, 610, 612 of a data communication network. As understood by those having skill in the art, network management software accumulates the particular characteristics of a network by either: (1) polling switches via application programming interface (API), command line interface (CLI) or simple network management protocol (SNMP); or (2) receiving warnings from switches on the network via API or SNMP. The network management software then displays the particular characteristics being tracked in a window, such as a widget, for the network administrator. Widget 602 tracks the number of events 608 in the network. Widget 604 tracks the top product memory utilization 610 of devices, such as routers and switches, in the network. Widget 606 tracks the top products with unused ports 612 in the network. Widget 606 is shown expanded or maximized, as indicated by upward pointing chevron symbol 622, in embodiments according to the present invention, and displays the number of unused ports 616 for each device 614 in the network. Widgets 602 and 604 are minimized, as indicated by downward pointing chevron symbols 618, 622 in embodiments according to the present invention. In embodiments according to the present invention, when a chevron symbol that indicates a widget is minimized is clicked by a user, the widget expands or maximizes as shown by widget 606. Conversely, when a chevron symbol that indicates a widget is maximized is clicked by a user, the widget minimizes as shown by widgets 602 and 604. Illustrating the prior art, minimized widgets 602 and 604 only display the widget title bar, which contains only the name of the specific characteristic 608, 610 tracked by widgets 602 and 604. Consequently, a network administrator has no way of knowing the number of events 608 on the network based on widget 602 or the top product memory utilization 610 based on widget 604 because both widgets 602 and 604 are minimized. Likewise, when widget 606 is minimized an administrator will no longer be able to see the number of unused ports 616 for any device 614 on the network using the widget. Therefore, there remains a need for a solution that allows a network administrator to monitor a network characteristic tracked by a widget, even when the widget is minimized.

Figure 7A:
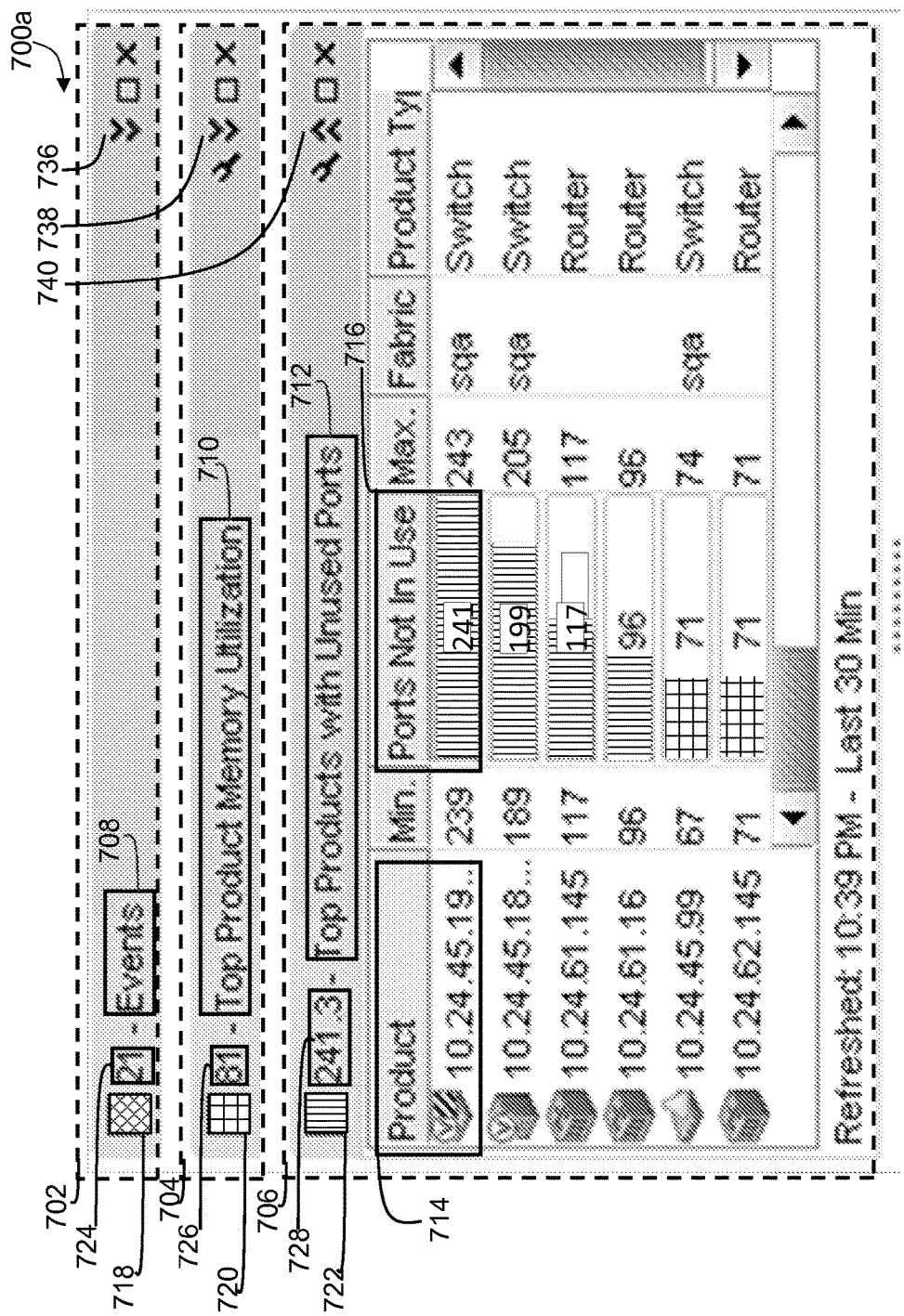
FIGS. 7a, 7b, and 7c are screenshots of an example of a GUI according to an embodiment of the invention.

FIG. 7A illustrates an example of the GUI 700 of management software 526 in accordance with the present invention. As shown, there are three widgets 702, 704, 706. Widgets 702, 704, 706 track a particular characteristic 708, 710, 712 of a data communication network. Widget 702 tracks the number of events 708 in the network. Widget 704 tracks the top product memory utilization 710 in the network. Widget 706 tracks the top products with unused ports 712 in the network. Widgets 702 and 704 are minimized, as indicated by downward pointing chevron symbols 736, 738, while widget 706 is fully expanded, as indicated by upward pointing chevron symbol 740. The expanded view of widget 706 displays the number of ports not in use 716 for each device 714 in the network with the devices sorted by decreasing number of unused ports.

The title bars of widgets 702, 704,706 all contain the name of the specific characteristic being tracked by each widget, such as "Events" 708, "Top Product Memory Utilization" 710, and "Top Products with Unused Ports" 712, as done in the example of FIG. 6. The title bar for each widget 702, 704, 706 further includes a color coded indicator 718, 720, 722 that indicates the severity level of the most severe alert triggered by the specific characteristic 708, 712, 710 being monitored by the widget. The color of the color coded indicators 718, 720, 722 tracks the severity level. For example, for the most severe alerts the color may be red. As the severity decreases the color may change to orange then yellow and then green, for example. The title bar for each widget 702, 704, 706 also includes a count indicator 724, 726, 728 representative of the value of specific characteristic causing the alert. The color coded indicators 718, 720, 722 and count indicators 724, 726, 728 allow an administrator to monitor network characteristics even when widgets 702, 704, 706 are minimized.

Figure 7B:
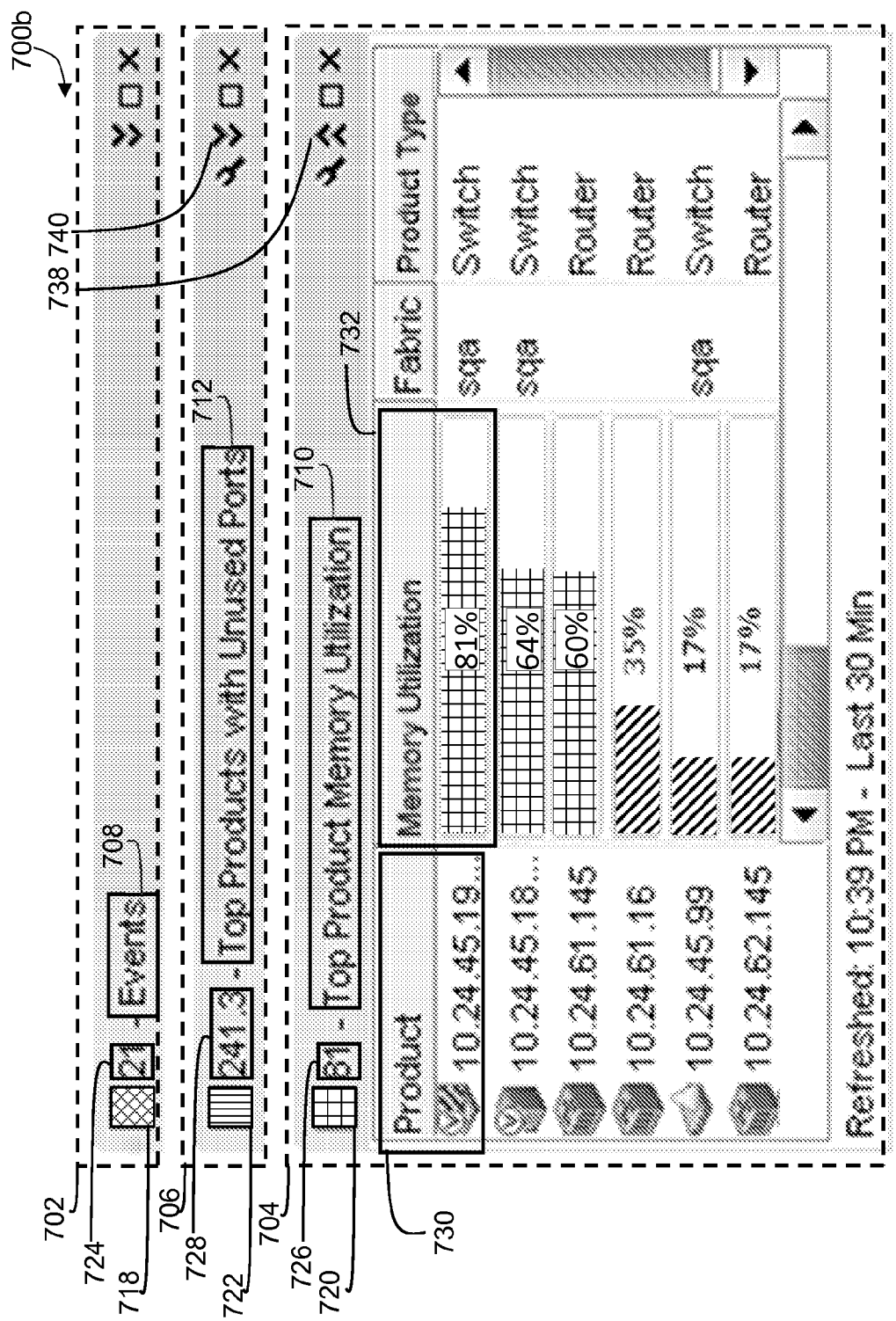
Figure 7C:
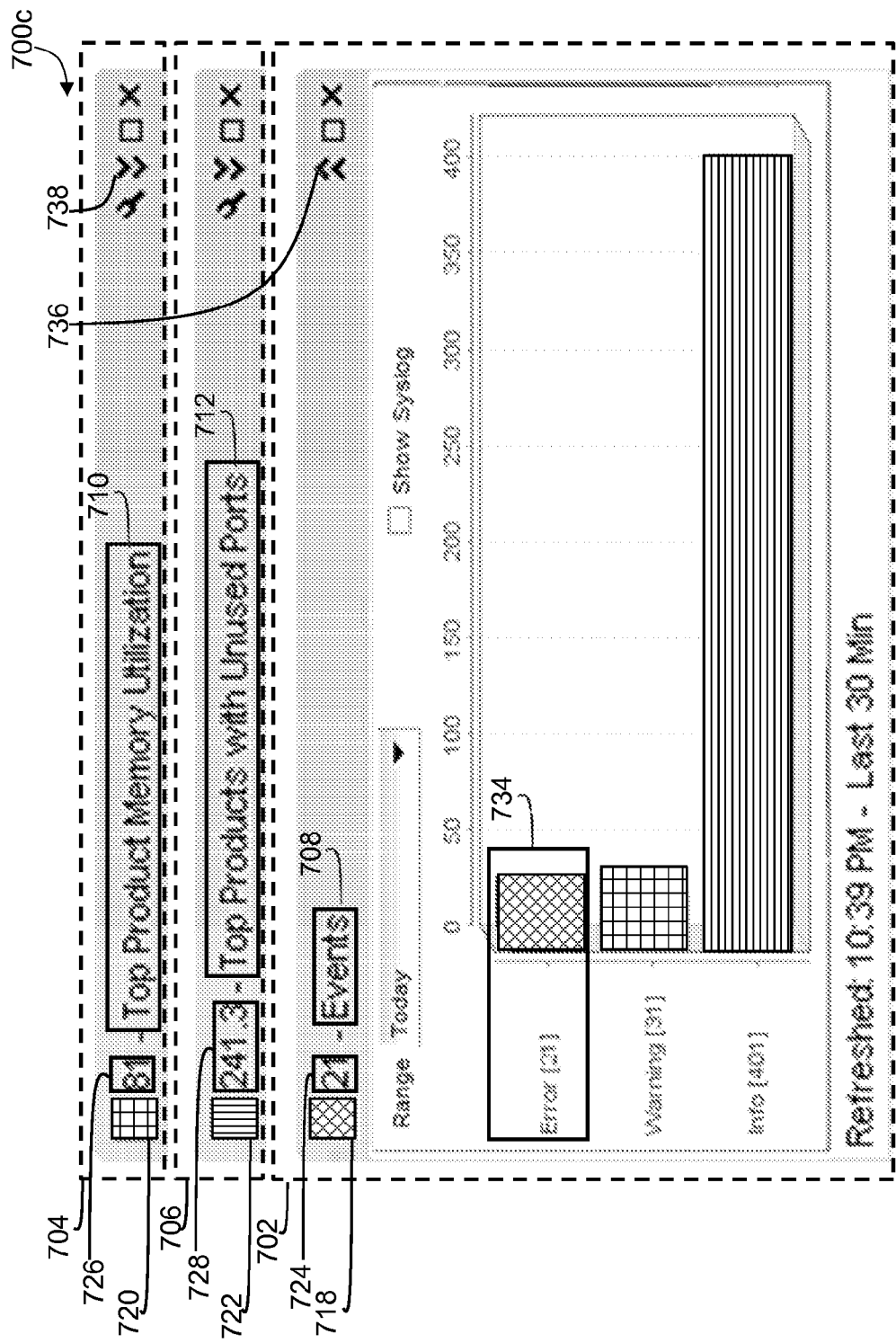

For example, widget 706 has a color coded indicator 722 with a red color, which indicates a high severity alert related to the number of unused ports on the network. The count indicator 728 represents the number of ports not in use 716 on device 714, which is the device having the highest number of unused ports. Consequently, even when widget 706 is minimized as shown in FIGS. 7B and 7C, an administrator will be able to identify the most severe alarm relating to the number of unused ports based on color coded indicator 722 and the count indicator 728. This allows an administrator to minimize multiple widgets, such as widgets 702, 704, 706, and still monitor specific characteristics of the network.

Turning to FIG. 7B, the same GUI 700 of network management software 526 is shown except that widget 706 has been minimized, as indicated by downward pointing chevron symbol 740, and widget 704 has been maximized, as indicated by upward pointing chevron symbol 738, to show memory utilization of the devices in decreasing order. Consequently, specific details relating to the memory utilization 732 of each device 730 on the network are now shown by widget 704, while only the title bar of widget 706 is now shown. Widget 704 has a color coded indicator 720 with a yellow color, indicating a low level alert. The count indicator 726 represents the memory utilization 732 of a single device 730 in the network having the highest memory utilization. Consequently, even when widget 704 is minimized as shown in FIGS. 7A and 7C, an administrator will be able to identify the highest alarm level relating to the memory utilization of products on the network based on color coded indicator 720 and the count indicator 726.

Turning to FIG. 7C, the same GUI 700 from FIG. 7B is shown except that widget 704 has been minimized, as indicated by downward pointing chevron symbol 738, and widget 702 has been maximized, as indicated by upward pointing chevron symbol 736, to show errors, warning and general information messages. Consequently, specific details relating to the number of events 708 on the network are now shown by widget 702, while only the title bar of widget 704 is now shown. Widget 702 has a color coded indicator 718 with an orange color, indicating a more severe alert level but not the highest level. The count indicator 724 corresponds to the number of errors 734 in the network. Consequently, even when widget 702 is minimized as shown in FIGS. 7A and 7B, an administrator will be able to identify the most severe alarm relating to the number of events on a network based on color coded indicator 718 and the count indicator 724.

It is understood that the present invention is not limited to using color coded indicators, but instead any object sufficient to indicate the severity of an alarm may be used. For example, differently shaped objects could be used, such as an octagonal stop sign, a triangular warning sign and a round acceptable sign.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
    displaying on a graphical display a window displaying status level of a selected network parameter in a ranked order for a plurality of network devices; and
    minimizing said window to a minimized format and displaying first and second indicators in said minimized format, said first and second indicators relating to the status of the network parameter for the network device ranked the highest, said first indicator being a graphical symbol indicative of the status level of said network parameter of said highest ranked network device and said second indicator being a numerical value of said network parameter of said highest ranked network device.

2. The method of claim 1, wherein the ranked order is based on the network device having the most severe status level.

3. The method of claim 2, wherein the graphical symbol corresponds by color to the status level of the network parameter of the highest ranked network device.

4. The method of claim 3, wherein the window is a widget.

5. One or more non-transitory processor-readable storage media encoded with computer-executable instructions for executing on a computer system a computing process comprising the following steps:
    displaying on a graphical display a window displaying status level of a selected network parameter in a ranked order for a plurality of network devices; and minimizing said window to a minimized format and displaying first and second indicators in said minimized format, said first and second indicators relating to the status of the network parameter for the network device ranked the highest, said first indicator being a graphical symbol indicative of the status level of said network parameter of said highest ranked network device and said second indicator being a numerical value of said network parameter of said highest ranked network device.

6. The one or more non-transitory processor-readable storage media of claim 5, wherein the ranked order is based on the network device having the most severe status level.

7. The one or more non-transitory processor-readable storage media of claim 6, wherein the graphical symbol corresponds by color to the status level of the network parameter of the highest ranked network device.

8. The one or more non-transitory processor-readable storage media of claim 7, wherein the window is a widget.

9. A computer system comprising:
a processor;
a display device coupled to said processor;
storage coupled to said processor and storing computer-executable instructions for an application which cause said processor to perform the following steps:

display on a graphical display a window displaying status level of a selected network parameter in a ranked order for a plurality of network devices; and minimize said window to a minimized format and display first and second indicators in said minimized format, said first and second indicators relating to the status of the network parameter for the network device ranked the highest, said first indicator being a graphical symbol indicative of the status level of said network parameter of said highest ranked network device and said second indicator being a numerical value of said network parameter of said highest ranked network device.

10. The computer system of claim 9, wherein the ranked order is based on the network device having the most severe status level.

11. The computer system of claim 10, wherein the graphical symbol corresponds by color to the status level of the network parameter of the highest ranked network device.

12. The computer system of claim 11, wherein the window is a widget.

* * * * *